Patented Dec. 16, 1941

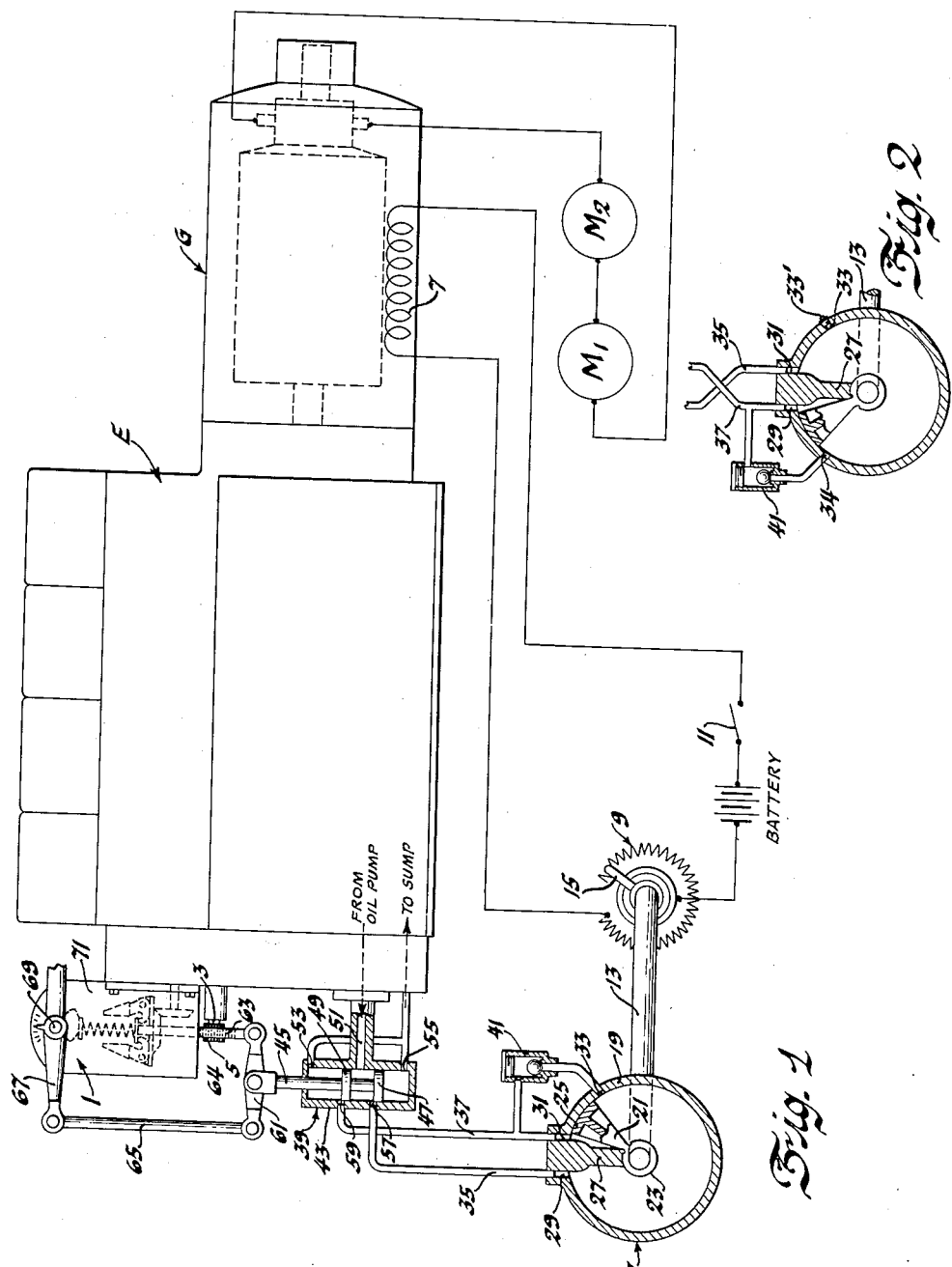

2,266,312

UNITED STATES PATENT OFFICE 2,266,312

POWER PLANT OUTPUT REGULATOR

Richard M. Dilworth, La Grange, Ill., assignor to General Motors Corporation, Detroit, Mich., a corporation of Delaware Application May 31, 1940, Serial No. 338,004

12 Claims. (Cl. 290—17)

This invention relates to output regulator mechanisms for power plants and more particularly to improved power actuating means therefor.

The invention is particularly adaptable for prime mover generator power plants for electrically driven vehicles, such as locomotives, where sudden and widely variable values of power demand are required from the power plant. These requirements make it necessary that the output regulating mechanism provided will respond instantly to slight changes in speed and power demand on the prime mover to adjust the output of the power plant and prevent overspeeding or overloading thereof in order to obtain maximum efficiency therefrom.

Conventional regulator mechanisms for the above described use usually include a governor responsive to the speed of the power plant which controls power actuating means, usually a fluid servo motor, which actuates means for regulating the amount of motive fluid supplied to the prime mover to vary the speed, torque and output thereof and also simultaneously actuates other means for regulating the generator output to vary the load on the prime mover so that it will operate at substantially constant speed and output. Manually operable means are also usually provided to modify the response of the governor so that the speed and output of the prime mover and the load thereon may be set at any one of a plurality of values corresponding to the available power output at each speed setting.

The power actuating means or fluid servo motor is usually operated by oil pressure from the lubricating pump of the prime mover, and a control valve operated by the governor is provided so that the servo device is caused to follow movement of the governor. It has been found, however, that wide variations in temperature and viscosity of the engine lubricating oil cause differences in the fluid drag friction of the servo which causes the movement thereof to lag that of the governor, causing overspeeding or overloading of the power plant. It has likewise been found that entrance of sludge or vapor into the fluid system, the latter sometimes being due to foaming of the oil or leaks in the system, will cause out of phase and erratic movement of the servo motor with respect to the governor, which causes excessive overspeeding or overloading of the power plant and hunting of the controls. In conventional systems sludge and vapor can be eliminated only by periodically cleaning the fluid system, generally requiring complete disassembly thereof.

The object of the present invention, therefore, is to provide simple means whereby the difficulties mentioned above occurring in conventional regulator mechanisms may be overcome, said means being operable to allow intermittent free circulation of the fluid through the fluid system which tends to maintain substantially constant temperature of the oil and the entire fluid servo mechanism and allows all foreign matter in the system to be flushed out periodically while in service, which greatly reduces variation in fluid frictional drag between the parts of the servo and insures in phase movement of the servo with the governor.

The means by which the above object is accomplished will be better understood by referring to the following detailed description and the accompanying drawing illustrating the invention in which:

Figure 1 shows the prime mover generator power plant in diagrammatic form and the output regulating means therefor in detailed diagrammatic form; and Figure 2 shows a servo motor similar to that shown in Figure 1 but with modified means and connections with the controls to provide different operating characteristics of the power plant.

Referring to Figure 1 of the drawing, a power plant comprising a generator G driven by a prime mover E is shown supplying power to an external load circuit connected to the generator which includes traction motors indicated at M1 and M2. The traction motors may be operatively connected to drive a vehicle, not shown, by any well known mechanical means. The prime mover E is shown as a Diesel engine provided with a governor 1 and any well known type of means for varying the speed torque and output thereof such as a fuel regulator, not shown, the adjustment of which is accomplished by a rotatable shaft 3 on which a pinion 5 is fixed for causing rotation thereof. In some installations these fuel regulating devices also vary the fuel injection timing as well as the amount of fuel injected in the engine cylinders. The generator G may be provided with a plurality of field excitation windings to provide inherent output regulation; one of these windings indicated at 7 is connected in series with a battery and generator excitation varying means shown at 9 upon closure of a switch 11. The generator excitation varying means serving as generator output regulating means is shown as a field rheostat of conventional type having a rotatable shaft 13 on which a contact 15 is fixed so that when moved with the shaft 13 the resistance of the rheostat may be varied to vary the excitation current in the field winding 7 and cause variation in the generator output and therefore the load on the prime mover.

Rotation of the shaft 13 to vary the generator excitation current is accomplished by power actuating means comprising a fluid servo motor shown at 17, which consists of a hollow cylindrical housing 19 having a central opening in which the shaft 13 is rotatably supported, a suitable packing gland, not shown, being provided in the opening to prevent fluid leakage therethrough. A vane type piston 21, having a boss 23 fixed to the shaft 13 and an enlarged arcuate shaped portion 25 in sliding engagement with the inner periphery of the housing, causes rotation of the shaft 13 in either direction when fluid pressure is applied to either side of the piston. A partition 27 extends radially inward from the peripheral portion of the housing, the inner end of which bears on the piston boss 23 in a fluid tight relation. Ports 29 and 31 are provided in the periphery of the housing 19 on either side of and adjacent the partition 27, and a third port 33, also in the peripheral portion of the housing, is shown spaced a distance from the port 31 slightly greater than the peripheral length of the enlarged arcuate shaped outer end portion 25 of the piston 21. Pipes 35 and 37 serve to connect the servo motor with a control valve 39 and the port 33 is interconnected with the pipe 37 by piping including automatic means operable by fluid pressure to allow one-way flow of fluid therethrough, said automatic means being shown at 41 as a ball check valve.

The control valve 39 comprises a hollow cylindrical housing 43 and a valve stem 45 having axially spaced lands 47 and 49 thereon which are slidable on the inner cylindrical surface of the housing 43. A port 51 is shown located centrally with respect to the housing which is shown connected to a source of fluid pressure such as the lubricating pump of the prime mover, and ports 53 and 55 located near the ends of the valve housing are shown connected by pipes to the lubricating sump of the engine E as indicated on the drawing. The pipes 35 and 37 are connected to ports 57 and 59, respectively, which are located in the valve housing so that they are simultaneously uncovered or covered by the lands 47 and 49 of the valve stem 45 when the stem is reciprocated. With the valve stem 45 in the position shown, the pipe 35 is connected to the pressure source or oil pump through ports 51 and 57 as the land 47 is slightly below the port 57, and the pipe 37 is connected to the lubricating sump, which is at substantially atmospheric pressure, through ports 53 and 59, the port 59 being uncovered by the valve stem land 49. The oil pressure applied through port 29 via the pipe 35 causes the piston to rotate counterclockwise to the position in which it is shown, and the oil ahead of the piston leaves the servo housing through port 31, pipe 37, and thence through the ports 59 and 53 to the sump until the piston 21 uncovers the port 33, which allows fluid pressure behind the piston to unseat the ball of the ball check valve 41 and allows free circulation of the oil from the pump through the servo motor and back to the sump, the piston being held in the position shown, which is the extreme position of counterclockwise rotation thereof, as long as the valve stem 45 is held in the position shown. Upward movement of the valve stem 45 until the valve ports 57 and 59 are covered by the valve lands 47 and 49, respectively, cuts off fluid pressure to and oil flow from the servo housing 17 to hold the piston 21 in any given position therein, and further upward movement of the valve stem 45 causes the lands 47 and 49 to uncover the ports 57 and 59 causing pressure to be applied to the pipe 37, which causes the ball check valve to close and allows oil to pass out of the servo motor through pipe 35 to the sump through the valve ports 57 and 55, to cause clockwise rotation of the piston 21. With the generator field rheostat 9 arranged and connected as shown, counterclockwise rotation of the piston 21, shaft 13 and contact 15 increases the resistance of the rheostat, which lowers the excitation current in the field winding 7 and thereby decreases the generator output and load on the prime mover. With the above parts in their extreme position of counterclockwise rotation and with the piston 21 in contact with the partition 27, the output of the generator and the load on the prime mover are minimum, and this position corresponds to the minimum torque and speed of the prime mover.

Movement of the valve stem 45 is accomplished by the floating lever 61, one end of which is pivotally connected to the governor sleeve 63 which moves in either direction upon an increase or decrease in speed of the prime mover from a given speed. The other end of the floating lever is pivotally connected to a link 65, the opposite end of which is pivotally connected to a governor speed setting lever 67 fixed to a shaft 69 rotatably supported in the governor housing 71. The position in which the floating lever 61, governor sleeve 63, link 65, and speed setting lever 67 are shown corresponds to the minimum speed, torque, and output of the prime mover corresponding to minimum output of the power plant. With the governor sleeve 63 in this position a minimum amount of fuel will be supplied to the engine, and movement of the shaft 3 to cause minimum supply of fuel is accomplished by the governor sleeve 63 which is provided with a rack portion 64 in mesh with the pinion 5 on the shaft 3. It will be evident that the shaft 3 may be rotated by the servo motor 17 if desired; as has been explained, the servo piston 21 follows the movement of the governor sleeve 63.

The governor 1 may be of any type, such as the centrifugal fly ball type shown. The parts of the governor are conventional and will be readily recognized; they are therefore shown in dotted lines and include the usual pivoted fly balls rotated by the engine by means of bevel gears. The fly balls are operatively connected to reciprocate the sleeve 63 upon variation in speed of the prime mover. A conventional compression spring is provided to load and prevent outward movement of the fly balls; one end of the spring rests on the governor sleeve 63, and the other end is in contact with a cam fixed to the shaft 69 to which the speed setting lever 67 is attached so that the load on the governor spring may be varied to vary the response of the governor when the speed setting lever and cam are moved to various positions to cause operation of the power plant at any one of a plurality of constant values of speed and output.

As the means for allowing free circulation of the fluid from the engine pump through the servo and back to the sump of the engine has been described when the parts of the servo and control mechanism are in the position shown, which corresponds to minimum output and idling speed of the power plant causing the fluid system to be flushed of any impurities such as sludge, vapor or air, and in addition causing a substantially constant temperature of the parts, as well as of the oil circulating therethrough, to be maintained so that the movement of the servo follows the movement of the governor exactly to prevent overloading and underloading of the engine, the operation for other values of output and speed will now be described briefly as follows:

When it is desired to increase the output of the power plant to cause the locomotive to be driven by the traction motors M1 and M2 the speed setting lever 67 is moved clockwise, which causes rotation of the shaft 69 and cam in the same direction to increase the load on the governor spring. Increased load of the spring causes the governor weights to move inwardly, moving the sleeve 63 downwardly and causing rotation of the shaft 3 in the proper direction to increase the amount of fuel supplied to the engine, thus increasing the torque, speed and output of the engine. The downward movement of the sleeve 63 moves the right end of the floating lever 61 downward, but the left end of this lever is moved upward by the link 65 connected between this end and the speed setting lever, which is moved upward. The movement of the valve 45, which is connected to the mid-point of the floating lever by the combined movement of the speed setting lever directly and the movement of the governor sleeve resulting from increased load on the governor to change the response thereof, causes the valve 45 to be moved to maintain the same generator output and load on the engine or to cause the load to be increased by causing the servo vane piston to move clockwise, which reduces the resistance in the excitation varying means or rheostat and increases the generator output and load on the engine. When the load on the engine is equal to the engine power output at the new speed value above the minimum, the valve 45 will be moved so that ports 57 and 59 will be closed and the vane will be stopped in a definite position. The linkage is so arranged that when the load on the engine is equal to the available output thereof at any speed selected by the position in which the speed setting lever is placed, the valve will always assume a position to close the valve ports 57 and 59. The floating lever thus provides means for moving the valve stem 45 to shut off fluid pressure to and oil flow from the servo for all speeds of the engine when the load thereon is equal to the available engine output. Variation in speed of the engine from the speed value selected, due to changes in load on the traction motors and therefore the generator, causes movement of the governor sleeve, which acts either to increase the speed, torque and output of the engine and at the same time reduce the load thereon by decreasing the excitation of the generator, or to decrease the speed, torque and output of the engine and increase the load thereon by increasing the excitation of the generator. It is apparent that the servo motor piston must follow exactly the movement of the governor sleeve so that the speed, torque and output of the engine and the load on the engine will be changed in a proper manner to maintain substantially constant speed and output of the engine at the particular value of speed selected without causing overloading or overspeeding of the engine. The means by which this is accomplished is the periodic flushing of the fluid servo system of any foreign matter therein each time the power plant output is reduced to a minimum, which on a locomotive used in switching service occurs frequently. When the locomotive is stopped with the power plant running idle, the oil circulating through the fluid servo means also keeps the parts of the mechanism and oil at substantially constant temperature, and when the power plant is shut down for long periods and then restarted the circulation of the oil completely fills and warms up the servo mechanism so that its movement exactly follows that of the governor and will not hunt or lag, which is the chief fault of conventional servo mechanisms not provided with means for warming up, filling, and flushing the entire fluid system.

Figure 2 shows a modified arrangement in which, if it is desired, maximum excitation can be maintained on the generator when the engine is idling instead of minimum excitation, as shown and described with reference to Figure 1. When the excitation current in the generator field winding 7 is minimum, that is, with maximum resistance in series therewith as shown in Figure 1, when the servo piston 21 is in its extreme limit of counterclockwise rotation a lower value of current will be supplied to the traction motors when the speed, torque and output of the engine are increased above the idling speed, and lower starting torque will be obtained.

If it is desired to provide higher values of starting torque the servo piston may be held in the opposite or extreme limit of clockwise rotation with the engine idling. The servo motor shown in Figure 2 is similar in all respects to that shown in Figure 1 except that an additional port 34 is provided on the opposite side of the partition 27 located in the housing periphery the same distance from the port 29 as the port 33 is from the port 31. The port 33 is shown closed by a pipe plug 33' and the ball check valve 41 is now connected between the port 34 and pipe 37 which is now connected to the port 29, and the pipe 35 is now connected to the port 31. By thus reversing the pipes 35 and 37 between the control valve and the ports 29 and 31 of the servo motor housing the vane piston 21 will be held in the extreme limit of clockwise rotation as shown in Figure 2, and the shaft 13 connected thereto will be moved so that minimum resistance will be inserted in series with the field winding 7 with the engine idling to give high values of starting torque when the engine speed is increased as explained above. It will be evident that the same advantages mentioned above will be present in the arrangement shown in Figure 2.

It will likewise be obvious that in order to obtain the same regulation as described by using the servo arrangement shown in Figure 2, the servo arrangement of Figure 1 may be retained and the conductor shown connected to one end of the resistance of the field rheostat 9 may be disconnected therefrom and reconnected to the opposite end of the resistance.

I claim:

1. An output regulator mechanism for a power plant comprising speed and load regulating means therefor, power means for actuating the regulating means, and means for controlling movement of said power means, said control means including means operable upon movement of said power means to a given position to allow continuous flow of power through said power means.

2. An output regulator mechanism for a power plant comprising speed and load regulating means therefor, power means for actuating said regulating means, control means for controlling the application of power to said power means to reverse or stop movement thereof, said control means including means operable automatically by one-way movement of said power means to a given position to maintain power flow therethrough, means responsive to speed of said power plant for controlling movement of said control means to maintain substantially constant speed and load of said power plant, and means for varying the speed response of said speed responsive means to preselect the speed and load of said power plant at any one of a number of values.

3. An output regulator mechanism for a prime mover generator power plant comprising speed, torque and output regulating means for the prime mover, output regulating means for the generator to regulate the load on the prime mover, power means adapted for actuating either or both of said regulating means, and control means for said power means, including a movable control member for controlling the application of power to said power means to cause said power means to follow movement of said control member, automatic control means operable upon movement of said power means to a given position to maintain continuous one-way flow of power through said control means and said power means, means responsive to slight variations in speed of said prime mover for moving said control member so that said prime mover operates at substantially constant output, and means for modifying the response of said speed responsive means.

4. An output regulator mechanism for a prime mover generator power plant comprising speed and torque regulating means for the prime mover, generator output regulating means for regulating the load on the prime mover, fluid pressure operated actuating means adapted to actuate said power plant regulating means, and control means for said fluid pressure operated actuating means comprising a control member movable in response to variations in speed of the prime mover, means for varying the speed response of said control member to cause operation of the prime mover at different values of speed, a control valve operably connected to said member and said means for controlling the application of fluid pressure to and fluid flow from said actuating means to reverse or stop movement of said actuating means in a position such that the load on the prime mover will be equal to the available output thereof at a given speed, and automatic valve means interposed between said fluid pressure operated actuating means and said control valve operable by fluid pressure upon movement of said power actuating means to a given position to allow free flow of fluid therethrough to fill and flush the fluid actuating and control means of impurities.

5. An output regulator mechanism for a vehicle comprising a generator, traction motors electrically connected to the generator for driving the vehicle, an engine for driving the generator, speed and torque regulating means for the engine, generator output regulating means to control the load on the engine, a hydraulic servo for actuating the engine and generator regulating means, a source of hydraulic pressure, a control valve for applying hydraulic pressure to and flow of fluid from said servo to reverse and stop the movement thereof, a check valve interposed between said servo and said control valve to allow free flow of fluid through said control valve, said check valve and said servo upon movement thereof in one direction to a given position corresponding to minimum or idling speed of the prime mover, and means for moving said control valve.

6. A regulator for a prime mover generator power plant comprising speed and load regulating means for the power plant, power means for actuating said regulating means, power connections extending from said power plant to said power means, control means included in said connections comprising means movable to control the flow of power in either direction through said connections to cause movement of said power means in either direction, and means actuated by one-way flow of power upon movement of said power means to one position to permit continuous flow of power through said power means.

7. A regulator mechanism for a prime mover generator power plant supplying power to vehicle traction motors comprising power plant speed, torque, and load regulating means, power means for actuating said regulating means, said power means deriving power from said prime mover and including power actuated means acting automatically upon movement of said power means to a given position to permit continuous one-way flow of power between said prime mover and said power means, and movable control means for controlling the flow of power in either direction to said power means to cause said power means to follow movement of said movable control means.

8. In an output and load regulator for a prime mover generator power plant comprising prime mover speed, torque, and output regulating means, generator excitation regulating means for regulating the load on said prime mover, a source of fluid pressure supply on said prime mover, a fluid servo including a cylinder having a pair of spaced ports and a central port therebetween, a piston movable in said cylinder between said spaced ports and operatively connected to said prime mover regulating means, fluid connections between said spaced ports and said fluid source of supply and including a control valve movable to cause fluid pressure to be applied to either side of the piston to cause movement of said piston in either direction in said cylinder, and a fluid by-pass connection between said central port and one of said spaced ports including a check valve to allow continuous flow of fluid through said servo for a given position of said piston to maintain said servo at a temperature substantially equal to that of said fluid.

9. A regulator for a prime mover electric generating power plant for vehicles comprising a prime mover having a fluid pressure lubricating system and means for varying the speed, torque, and output thereof, a generator driven by the prime mover having excitation regulating means for varying the load on the prime mover, a fluid servo motor for actuating said generator excitation regulating means, fluid connections between the lubricating system of the prime mover and said servo motor, a control valve included in said connections operably connected to said means for varying the speed, torque, and output of said prime mover for controlling admission of fluid pressure to said fluid servo to cause movement thereof, and a fluid connection from said servo to said valve including a check valve operable by fluid pressure upon movement of said fluid motor to a given position to allow fluid to flow through said servo motor to flush, fill, and maintain the temperature of the motor substantially equal to that of the fluid.

10. A load regulator for a generating electric vehicle comprising a prime mover, a generator driven thereby, a plurality of vehicle traction motors electrically connected to the generator, said generator having excitation regulating means for controlling the power input to the motors and the load on the prime mover, a fluid pressure operated servo motor for actuating said generator excitation regulating means, a control valve operable to control admission of fluid pressure to said servo to cause the servo to follow movement of said valve, and a fluid by-pass connection between said servo and said valve, said by-pass connection including a check valve operable by one-way flow of fluid pressure in said connection upon movement of said servo and valve to a position corresponding to minimum power input to the motors and minimum load on the prime mover to flush said servo of impurities and maintain it filled and at a temperature equal to that of the fluid.

11. A speed and load regulator for a prime mover electric generating power plant comprising a prime mover, an electric generator driven thereby, generator excitation regulating means for controlling the generator output to regulate the load on the prime mover to control the speed thereof, a fluid motor for actuating said regulating means, a governor operating in accordance with the speed and load of the power plant, means operable to vary the speed response of said governor, a control valve operatively connected to both said governor and the means for varying the speed response thereof to control admission of fluid pressure to said servo and actuation of said regulating means to maintain constant speed and load of said power plant at any one of a plurality of preselected values, and a fluid by-pass connection between said servo and valve including a fluid pressure actuated check valve permitting fluid flow through said servo upon movement of said servo to a position corresponding to minimum load on said power plant.

12. In a power plant regulator for a vehicle comprising a prime mover having a fluid pressure lubricating system and means for regulating the speed and torque thereof, a generator driven by the prime mover having excitation regulating means to vary the load on the prime mover and means for controlling both said prime mover and said generator regulating means to maintain the speed, torque, and load of the prime mover constant, said control means comprising a fluid pressure servo motor for actuating said generator excitation regulating means, fluid pressure connections interconnecting the servo motor with the prime mover lubricating system, a control valve included in said connections operable to control movement of said servo motor, pressure operated by-pass means associated with and controlled by said valve and servo motor to allow by-pass of fluid therethrough, a governor operating in response to the speed of said prime mover to control said prime mover regulating means and said control valve to maintain constant speed, torque, output, and load on the prime mover, and manually operable means for varying the speed response of said governor to cause operation of said prime mover at any preselected value of speed, torque, output, and load desired, operation of said prime mover at one value causing by-pass of fluid through said servo motor.

RICHARD M. DILWORTH.